United States Patent [19]

Kinoshita et al.

[11] Patent Number: 5,583,177
[45] Date of Patent: Dec. 10, 1996

[54] POLYAMIDE RESIN COMPOSITION

[75] Inventors: Koji Kinoshita; Nori Yoshihara, both of Otsu; Minoru Hayashi; Kiyotaka Nakai, both of Kariya, all of Japan

[73] Assignees: Toyo Boseki Kabushiki Kaisha, Osaka; Aisin Seiki Kabushiki Kaisha, Kariya, both of Japan

[21] Appl. No.: 257,563

[22] Filed: Jun. 10, 1994

[30] Foreign Application Priority Data

Jun. 11, 1993 [JP] Japan ..................... 5-140782

[51] Int. Cl.$^6$ .................... C08L 77/00; C08L 83/02
[52] U.S. Cl. ............. 524/600; 524/494; 528/310; 528/322; 525/66; 525/397
[58] Field of Search ...................... 524/600, 494; 528/310, 322

[56] References Cited

U.S. PATENT DOCUMENTS

| | | | |
|---|---|---|---|
| 5,086,105 | 2/1992 | Abe et al. | 524/492 |
| 5,089,353 | 2/1992 | Negi et al. | 428/518 |
| 5,166,237 | 11/1992 | Abe et al. | 524/114 |
| 5,346,950 | 3/1994 | Negi et al. | 525/57 |
| 5,387,645 | 2/1995 | Montag et al. | 525/66 |

FOREIGN PATENT DOCUMENTS

| | | |
|---|---|---|
| 61-204263 | 9/1986 | Japan . |
| 63-310452 | 5/1988 | Japan . |

Primary Examiner—Samuel A. Acquah
Assistant Examiner—P. Hampton-Hightower
Attorney, Agent, or Firm—Foley & Lardner

[57] ABSTRACT

There is disclosed a polyamide resin composition containing: (A) 85 to 95 parts by weight of a polyamide resin; (B) 5 to 15 parts by weight of wollastonite; (C) 3 to 10 parts by weight, to 100 parts by the total weight of ingredients (A) and (B), of a styrene copolymer modified with at least one modifier selected from the group consisting of unsaturated carboxylic acids and unsaturated dicarboxylic anhydrides; and (D) 0.5 to 5 parts by weight, to 100 parts by the total weight of ingredients (A) and (B), of a high-density polyethylene modified with at least one modifier selected from the group consisting of unsaturated carboxylic acids and unsaturated dicarboxylic anhydrides, the high-density polyethylene having a weight-average molecular weight of 50,000 to 400,000.

4 Claims, 1 Drawing Sheet

POLYAMIDE RESIN COMPOSITION

FIELD OF THE INVENTION

The present invention relates to a polyamide resin composition used for the production of sliding parts. More particularly, it relates to a polyamide resin composition which can provide sliding parts having a low coefficient of sliding friction, a low abrasion loss due to the surface roughness and a low degree of malfunction due to the repeated fatigue.

BACKGROUND OF THE INVENTION

In general, polyamide resins have excellent mechanical characteristics and excellent abrasion resistance, and therefore, they have been widely used as a molding material for sliding parts such as gears, cams and bearings. The plastic materials employed for this kind of application are usually required to meet the following conditions:

(1) They have a low coefficient of sliding friction.
(2) They have a low abrasion loss due to the surface roughness.
(3) They have excellent mechanical characteristics, e.g., high limit of fatigue against continuous load such as repeated fatigue.
(4) They have a high softening temperature.
(5) They can easily be molded into various parts.

However, conventional polyamide resins exhibit the above characteristics only to an unsatisfactory extent; in particular, the abrasion loss due to the surface roughness cannot be decreased, and the limit of fatigue against continuous load such as repeated fatigue is insufficient.

For this reason, commercially available polyamide resin compositions usually contain various kinds of additives such as PTFE (polytetrafluoroethylene) resins, silicone oil, mineral oils or high-density polyethylenes for the purpose of decreasing the friction coefficient thereof. These additives have no compatibility with polyamide resins or they exhibit no interfacial adhesion to the polyamide resins; therefore, these polyamide resin compositions still have a high abrasion loss due to the surface roughness and an insufficient limit of fatigue against continuous load such as repeated fatigue.

There can be found another polyamide resin composition which is obtained by adding a mixture of ethylene/propylene/1,4-hexadiene and ethylene/maleic anhydride to a polyamide resin (see, e.g., JP-A 51-143061/1976). With the use of this polyamide resin composition, it is possible to obtain molded parts having an improved impact resistance, which leads to a slightly improved limit of fatigue against continuous load such as repeated fatigue; however, the abrasion loss due to the surface roughness cannot be decreased.

SUMMARY OF THE INVENTION

Under these circumstances, the present inventors have intensively studied to obtain a polyamide resin composition which can provide molded parts having a low coefficient of sliding friction, a low abrasion loss due to the surface roughness and a sufficiently high limit of fatigue against continuous load such as repeated fatigue. As the result, they have found that such a polyamide resin composition can be obtained by adding particular ingredients in designated amounts to a polyamide resin, thereby completing the present invention.

Thus, the present invention provides a polyamide resin composition comprising: (A) 85 to 95 parts by weight of a polyamide resin; (B) 5 to 15 parts by weight of wollastonite; (C) 3 to 10 parts by weight, to 100 parts by the total weight of ingredients (A) and (B), of a styrene copolymer modified with at least one modifier selected from the group consisting of unsaturated carboxylic acids and unsaturated dicarboxylic anhydrides; and (D) 0.5 to 5 parts by weight, to 100 parts by the total weight of ingredients (A) and (B), of a high-density polyethylene modified with at least one modifier selected from the group consisting of unsaturated carboxylic acids and unsaturated dicarboxylic anhydrides, said high-density polyethylene having a weight average molecular weight of 50,000 to 400,000.

DETAILED DESCRIPTION OF THE INVENTION

Figure 1:
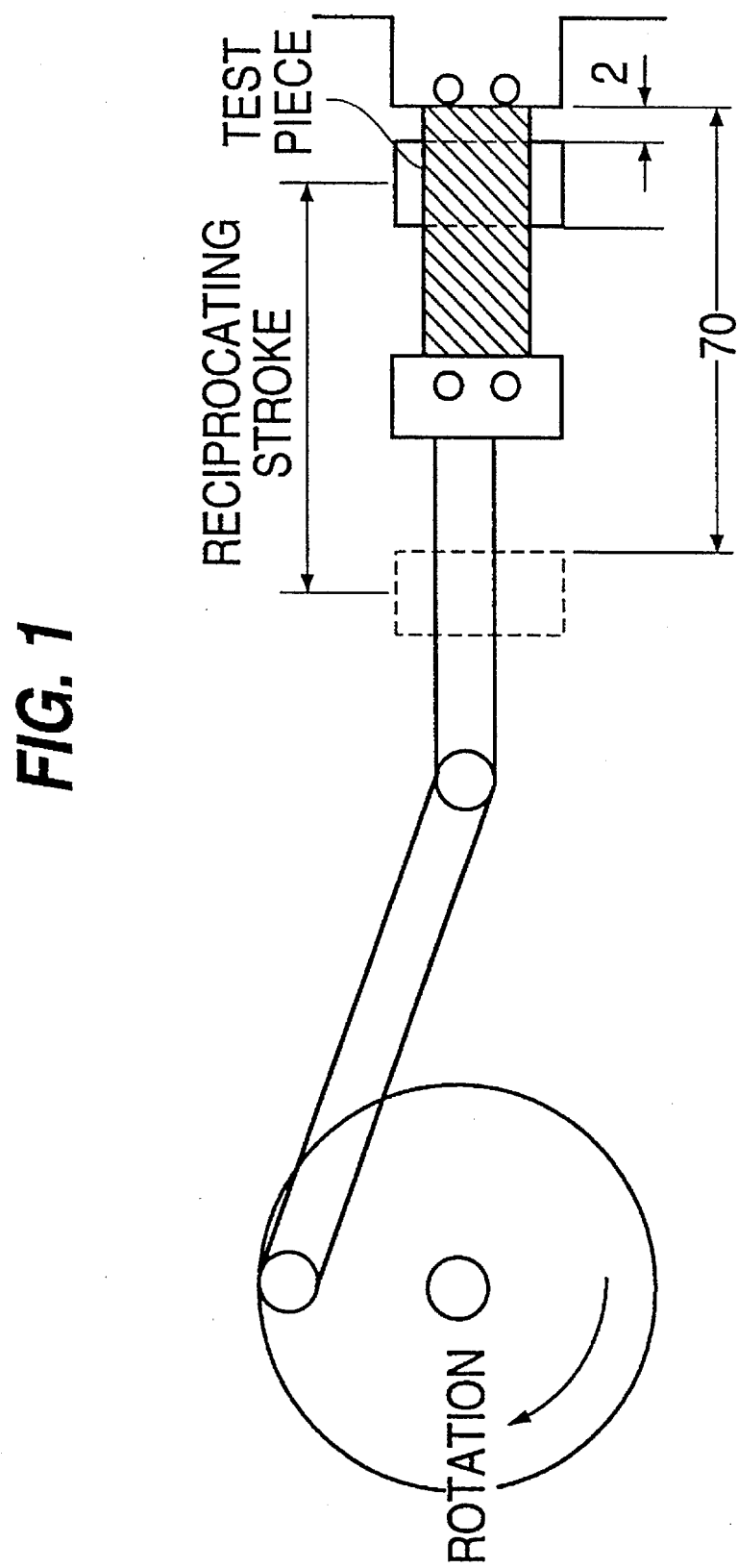
FIG. 1 is a schematic diagram showing the main portions of a measuring apparatus used for the evaluation of repeated fatigue characteristics.

The polyamide resin composition of the present invention contains four essential ingredients: (A) at least one polyamide resin; (B) wollastonite; (C) at least one styrene copolymer modified with at least one modifier selected from the group consisting of unsaturated carboxylic acids and unsaturated dicarboxylic anhydrides; and (D) at least one high-density polyethylene modified with at least one modifier selected from the group consisting of unsaturated carboxylic acids and unsaturated dicarboxylic anhydrides.

In the present invention, as the polyamide resin, any conventional polyamide can be used alone or in combination, examples of which are nylon 6, nylon 66, nylon 610 and nylon 11. The amount of polyamide resin to be used is usually in the range of 85 to 95 parts by weight.

The wollastonite used in the present invention is an inorganic filler, and it can be selected from various commercial sources. The amount of wollastonite to be used is usually in the range of 5 to 15 parts by weight, preferably 5 to 10 parts by weight. Amounts of less than 5 parts by weight are not preferred because the resulting molded parts have unsatisfactory mechanical properties and thermal properties. Amounts of greater than 15 parts by weight are also not preferred because it is difficult to obtain molded parts having a good surface and the resulting molded parts have a deteriorated resistance to abrasion.

As described above, the polyamide resin composition of the present invention contains, in addition to the above polyamide resin and wollastonite, at least one modified styrene copolymer and at least one modified high-density polyethylene as the essential ingredients, both of which have been modified with at least one modifier selected from the group consisting of unsaturated carboxylic acids and unsaturated dicarboxylic anhydrides. These ingredients make a contribution to improvements in the frictional characteristics and limit of fatigue.

The styrene copolymer used in the present invention may be any conventional styrene block copolymer of the S(styrene)-B(butadiene)-S(styrene) type, having a symmetric block structure, wherein the letters S and B refer to an end polymer block and a center polymer block, respectively. The center block B is preferably composed of polybutadiene, although it may be replaced by polyisoprene. Also recommended are hydrogenated styrene block copolymers (SEBS) in which some double-bond portions of polybutadiene are changed into saturated alkyl groups (i.e., ethylene chains) by hydrogenation. The end block S refers to a polymer block of aromatic hydrocarbons, and is preferably composed of polystyrene. The molecular weight of the end block S is usually in the range of 4000 to 115,000, preferably 5000 to 15,000. The molecular weight of the center block B is usually in the range of 20,000 to 450,000, preferably 25,000 to 100,000.

The hydrogenated styrene block copolymers can readily be obtained from various commercial sources; for example, they are commercially available under the trade names and grade names such as "Kraton G1650", "Kraton G1651" and "Kraton G1657" from Shell Chemical Co.

The high-density polyethylene before modification in the present invention refers to a high-density polyethylene having a molecular weight of 50,000 to 400,000 and a density of 0.94 kg/cm$^3$ or higher. Molecular weights less than 50,000 are not preferred because the resulting molded parts have an insufficient resistance to abrasion. Molecular weights greater than 400,000 are also not preferred because the production of molded parts becomes difficult. The high-density polyethylene used in the present invention may contain at least one additional copolymerizable monomers within the limits of not deteriorating the properties thereof, examples of which are α-olefins such as propylene, 1-butene, pentene, 4-methyl-1-pentene, hexene, octene and decene; dienes such as butadiene and isoprene; cycloolefins such as cyclopentene, cyclohexene and cyclopentadiene; and acrylates such as methyl acrylate, ethyl acrylate and butyl acrylate.

The styrene copolymer and high-density polyethylene can be modified with at least one modifier selected from the group consisting of unsaturated carboxylic acids, such as acrylic acid, methacrylic acid, crotonic acid and oleic acid, and unsaturated dicarboxylic anhydrides, such as maleic anhydride, itaconic anhydride and citraconic anhydride. These modifiers may be used alone or in combination. Particularly preferred is maleic anhydride.

The modification of a styrene copolymer or high-density polyethylene with an unsaturated carboxylic acid and/or unsaturated dicarboxylic anhydride can be effected by mixing the styrene copolymer or high-density polyethylene and the unsaturated carboxylic acid and/or unsaturated dicarboxylic anhydride in the presence of a peroxide for radical formation, and then kneading this mixture in an extruder or a mixer at 100° to 250° C. for 1 to 10 minutes. The amount of unsaturated carboxylic acid or unsaturated dicarboxylic anhydride to be used is preferably in the range of 0.1 to 5 parts by weight, based on the weight of the styrene copolymer or high-density polyethylene.

The modified styrene copolymer is used in an amount of 3 to 10 parts by weight, to 100 parts by the total weight of the polyamide resin and the wollastonite. Amounts of less than 3 parts by weight are not preferred because no improvement in the repeated fatigue characteristics can be attained. Amounts of greater than 10 parts by weight are also not preferred because the resulting molded parts have a high abrasion loss due to the surface roughness. The amount of modified high-density polyethylene to be used is usually in the range of 0.1 to 5 parts by weight, to 100 parts by the total weight of the polyamide resin and the wollastonite. Amounts of less than 0.5 parts by weight are not preferred because the resulting molded parts have an insufficient resistance to abrasion. Amounts of greater than 5 parts by weight are also not preferred because the resulting molded parts exhibit a deterioration of mechanical properties such as stiffness and a decrease in the heat resistance.

For the purpose of further improving sliding characteristics (i.e., frictional and abrasional characteristics) of molded parts, the polyamide resin composition of the present invention may contain, in addition to the above four essential ingredients, various additives such as carbon fibers, powdered fluorocarbon resins, molybdenum disulfide and glass beads. For the purpose of improving the mechanical and electrical properties, the polyamide resin composition of the present invention may contain ordinary fillers such as calcium carbonate and barium sulfate; and electrical conductivity-improving fillers such as whiskers of potassium titanate, carbon black and metal powders within the limits of not deteriorating the sliding characteristics of the resin molded parts. Further, the polyamide resin composition of the present invention may contain additional additives such as inhibitors against any deterioration by oxygen, heat, ultraviolet ray or the like, stabilizers, lubricants, plasticizers, flame-retardants, antistatic agents, colorants and mold release agents within the limits of not deteriorating the sliding characteristics of the resin molded parts.

The polyamide resin composition of the present invention can be prepared by kneading the above ingredients together in an apparatus such as a single-screw extruder, twin-screw extruder, kneader or double roller. The kind of kneading apparatus and kneading conditions to be employed are not particularly limited.

EXAMPLES

The present invention will be further illustrated by way of the following examples, which are not to be construed to limit the scope thereof.

The physical properties of the polyamide resin compositions obtained in the examples were measured according to the following test procedures.

Resistance to sliding friction: using a thrust abrasion tester of the Suzuki style and a sheet of S-45C steel (described in JIS G4051; frictional area, 1.6 cm$^2$) as an opposite material, frictional coefficient μ was determined after the continuous operation for 1 hour at a speed of 10 cm/s under a load of 40 kg/cm$^2$.

Resistance to abrasion due to surface roughness: using a Taber abrader and an H-18 abrasive wheel, abrasion loss of resin molded parts was determined in mg after one thousand (1000) rotations.

Repeated fatigue characteristics: A flexing fatigue tester was produced as shown in the schematic diagram of FIG. 1, and the cycle number of flexing at which various appearance abnormalities (e.g., wrinkles, chalking, cracks) were found on the resin molded parts (10 mm in width and 1 mm in thickness) as a sample was determined. The stroke between the chucks was 68 mm (maximum, 70 mm; minimum, 2 mm).

EXAMPLES 1–3 AND COMPARATIVE EXAMPLES 1–6

As the polyamide resin, nylon 6 (Relative Viscosity by JIS K6810=2.5) was used. As the styrene copolymer before modification, SEBS (hydrogenated styrene-butadiene block copolymer; Kraton G1657, available from Shell Chemical Co.) was used. As the high-density polyethylene before modification, a polyethylene having a weight-average molecular weight of 45,000, 140,000 or 1,000,000 (Hizex, available from Mitsui Petrochemical Industries, Ltd.) was used. The styrene copolymer and high-density polyethylene were modified by adding 0.3% by weight of 2,5-dimethyl-2,5-di-(t-butylperoxy)hexane (Perhexin 25B, available from Nippon Oil & Fats Co., Ltd.) as a peroxide and 1% by weight of maleic anhydride, and then melt mixing them at 240° C. for 3 minutes, which afforded a modified product containing maleic acid as a graft monomer in an amount of 0.5% by weight.

The ingredients were mixed together in the respective designated amounts shown in Tables 1 and 2 with a 30 mm twin-screw extruder to form pellets. At that time, the cylinder temperature was adjusted to 265° C. The resulting pellets were dried under vacuum at 70° C. for 16 hours. These pellets were molded into a test piece with an injection molding apparatus adjusted to the cylinder temperature of 265° C. and the mold temperature of 80° C. The test piece was evaluated for the physical properties as described above. The results are shown in Tables 1 and 2.

TABLE 1

| | Examples | | | | | |
|---|---|---|---|---|---|---|
| | 1 | 2 | 3 | 4 | 5 | 6 |
| Ingredients (parts by weight) | | | | | | |
| Nylon 6 | 90 | 90 | 90 | 85 | 95 | 90 |
| Wollastonite | 10 | 10 | 10 | 15 | 5 | 10 |
| SEBS, modified | 3 | 3 | 5 | 5 | 5 | 10 |
| SEBS, unmodified | — | — | — | — | — | — |
| Polyethylene | | | | | | |
| MW: 45,000, modified | — | — | — | — | — | — |
| MW: 140,000, modified | 2.5 | 5 | 2.5 | 2.5 | 2.5 | 5 |
| MW: 1,000,000, modified | — | — | — | — | — | — |
| MW: 140,000, unmodified | — | — | — | — | — | — |
| Friction coefficient μ | 0.10 | 0.09 | 0.10 | 0.12 | 0.10 | 0.12 |
| Taber-abrasion (mg/1000 times) | 72 | 62 | 84 | 88 | 70 | 94 |
| Repeated fatigue characteristics | | | | | | |
| Number of flexing leading to appearance change (times) | 8200 | 12,000 | ≧15,000 | ≧15,000 | ≧15,000 | ≧15,000 |
| Appearance of molded parts | good | good | good | good | good | good |

TABLE 2

| | Comparative Examples | | | | | | |
|---|---|---|---|---|---|---|---|
| | 1 | 2 | 3 | 4 | 5 | 6 | 7 |
| Ingredients (parts by weight) | | | | | | | |
| Nylon 6 | 90 | 90 | 90 | 90 | 80 | 90 | 90 |
| Wollastonite | 10 | 10 | 10 | 10 | 20 | 10 | 10 |
| SEBS, modified | 5 | 5 | 5 | — | 5 | — | — |
| SEBS, unmodified | — | — | — | 5 | — | — | 20 |
| Polyethylene | | | | | | | |
| MW: 45,000, modified | 2.5 | — | — | — | — | — | — |
| MW: 140,000, modified | — | — | — | 2.5 | 2.5 | — | — |
| MW: 1,000,000, modified | — | 2.5 | — | — | — | — | — |
| MW: 140,000, unmodified | — | — | 2.5 | — | — | — | 10 |
| Friction coefficient μ | 0.12 | 0.10 | 0.10 | 0.12 | 0.10 | 0.28 | 0.14 |
| Taber-abrasion (mg/1000 times) | 116 | 88 | 125 | 163 | 128 | 120 | 141 |
| Repeated fatigue characteristics | | | | | | | |
| Number of flexing leading to appearance change (times) | ≧15,000 | ≧15,000 | 12,200 | 920 | 1340 | 720 | ≧15,000 |
| Appearance of molded parts | good | flow marks | good | good | good | good | good |

As described above, the polyamide resin composition of the present invention can provide sliding parts having a low coefficient of sliding friction, a low abrasion loss due to the surface roughness and a low degree of malfunction due to the repeated fatigue, and it is, therefore, very useful as a molding material for dynamic applications such as gears, cams and bearings.

What is claimed is:

1. A polyamide resin composition comprising: (A) 85 to 95 parts by weight of a polyamide resin; (B) 5 to 15 parts by weight of wollastonite; (C) 3 to 10 parts by weight, to 100 parts by the total weight of ingredients (A) and (B), of a styrene copolymer substituted with at least one modifier selected from the group consisting of unsaturated carboxylic acids and unsaturated dicarboxylic anhydrides; and (D) 0.5 to 5 parts by weight, to 100 parts by the total weight of ingredients (A) and (B), of a polyethylene substituted with at least one modifier selected from the group consisting of unsaturated carboxylic acids and unsaturated dicarboxylic anhydrides, said polyethylene having a density greater than or equal to about 0.94 kg/cm$^3$ and having a weight-average molecular weight of 50,000 to 400,000.

2. A polyamide resin composition according to claim 1, wherein the polyamide resin is nylon 6.

3. A polyamide resin composition according to claim 1, wherein the modifier is maleic anhydride.

4. A polyamide resin composition according to claim 1, wherein the styrene copolymer is a hydrogenated styrene-butadiene block copolymer.

* * * * *